US005493567A

United States Patent [19]
Boyer et al.

[11] Patent Number: 5,493,567
[45] Date of Patent: Feb. 20, 1996

[54] ALLOCATION OF TIME INTERVAL SYSTEMS AND MULTIPLEXERS PROVIDED WITH ONE OF THESE ALLOCATIONS OF TIME INTERVAL SYSTEMS

[75] Inventors: Pierre Boyer, Lannion; Olivier Dugeon, Pleumeur-Bodou; Michel Servel, Lannion, all of France

[73] Assignee: France Telecom, France

[21] Appl. No.: 271,040

[22] Filed: Jul. 6, 1994

[30] Foreign Application Priority Data

Jul. 30, 1993 [FR] France ................................. 93 09645

[51] Int. Cl.$^6$ ............................... H04L 12/56; H04J 3/16
[52] U.S. Cl. ......................... 370/60.1; 370/95.1; 370/112
[58] Field of Search ......................... 370/60, 60.1, 85.7, 370/94.1, 94.2, 95.1, 112, 85.2; 364/242.6, 242.91, 242.92, 242.93

[56] References Cited

U.S. PATENT DOCUMENTS

| | | | |
|---|---|---|---|
| 4,969,149 | 11/1990 | Killat et al. | 370/94.1 |
| 5,138,612 | 8/1992 | Keller et al. | 370/60 |
| 5,199,028 | 3/1993 | Arnold | 370/60 |
| 5,249,180 | 9/1993 | Sennema et al. | 370/60 |
| 5,268,896 | 12/1993 | Pauwels | 370/60 |
| 5,357,512 | 10/1994 | Khaira et al. | 370/85.2 |

OTHER PUBLICATIONS

French Search Report.

*Primary Examiner*—Hassan Kizou
*Attorney, Agent, or Firm*—Laff, Whitesel, Conte & Saret, Ltd.

[57] ABSTRACT

A data transmission system has a time interval allocation system with a time interval management unit (UGIT) and a plurality of counters ($CSO_1$ to $CSO_n$) connected to one another in a cascaded series. The input of a counter ($CSO_i$) is connected to the output of the preceding counter ($CSO_{i-1}$) in the series. The input of the first counter ($CSO_1$) is connected to the output of the time intervals management unit. Each counter ($CSO_i$) is associated with an input carrying a time interval allocation demand signal ($dem_i$) and provided with a command input for receiving the allocation demand signal ($dem_i$) and delivering either the time interval value (ITin) present on its input if the allocation demand signal ($dem_i$) is inactive, or the time interval value present on its input increased by a unit (ITin+1) if the demand signal ($dem_i$) is active. The output of each counter ($CSO_i$) is connected to the input of a register ($RegAd_i$), having a command input for receiving the corresponding demand signal ($dem_i$). Then, each register ($RegAd_i$) delivers an allocated time signal (ITa) if the corresponding demand signal ($dem_i$) is active.

11 Claims, 8 Drawing Sheets

ALLOCATION OF TIME INTERVAL SYSTEMS AND MULTIPLEXERS PROVIDED WITH ONE OF THESE ALLOCATIONS OF TIME INTERVAL SYSTEMS

The present invention concerns allocation of time interval systems and multiplexers provided with one of these allocation of time interval systems.

These systems and multiplexes find application in data transmission systems, the data being in the form of cells of fixed length. Each cell of the transmission system is associated with a communication virtual circuit. Each cell is constituted, on the one hand, by a heading point in which are stocked information relative to the systems, in particular, the number of the virtual circuits to which it belongs and, on the other hand a part where there are present the messages to be transmitted.

Multiplexers used in such systems of communication are already known. The architecture of these known multiplexers is based on that of commutation techniques. Thus, the document of patent EP-A-108028 describes a commutation matrix which is well adapted to the commutation of incoming multiplexes or on outgoing multiplexes at very high outputs. However, when the outputs are lower it may be provided interesting to use multiplexers whose architecture is better adapted to these outputs.

For example, in the document of patent FR-A-2538984 there are described multiplexers based on an architecture so-called with bus with in inputs in parallel and an output on the bus, capable of being equal to eight for an overall commutated output of the order of 155 Mbits/s. However, the access to the bus presents problems of time interval allocation so is to avoid in particular the collision of cells or the overflowing of the output files.

Solutions are known but they are not always adapted to the problems originated from the control of the spacing between cells transmitted belonging to a virtual circuit, in particular when there is present a notable difference of output between two consecutive cells.

The object of the invention is to propose systems of time interval allocation which can solve the problems mentioned above when these systems are applied to multiplexers. These systems are not limited to these particular applications.

Another object of the invention is likewise to propose multiplexers with input and an outlet which leads to solving the problems of access to the bus.

Another object of the invention is likewise to propose multiplexers which likewise permit integrating control and spacing means of the transmissions of cells belonging to the same virtual circuit.

For this purpose, a system of allocation of a time interval according to a first embodiment of the invention is characterised in that it comprises a management unit of time intervals, delivering to each time interval the last time interval which has been allocated. A plurality of counters are connected to one another in series so that the input of one counter is connected to the output of the preceding counter in the series. The input of the first counter is connected to the output of the management unit of time intervals. Each counter is associated with an input carrying a demand for allocation of time interval signals and being provided with a command input for receiving the allocation demand signal and for delivering either the time interval value present on its input if the said allocation demand signal is inactive or the time interval value present on its input is increased by a unit if the demand signal is active. The output of each counter is connected to the input of a register the command input of which is provided to receive the corresponding demand signal. Each register then delivers, if the corresponding demand signal is active, an allocated time interval signal.

An allocation of a time interval system according to a second embodiment of the invention is characterised in that it comprises a time interval management unit delivering to each time interval, the last time interval which has been allocated. A plurality of groups are connected to one another in series so that the input of one group is connected to the output of the preceding group in the series. The input of the first group is connected to the output of the time intervals management unit. Each adder of each group has a first input connected to the input of the group and is associated with an input carrying a demand for allocation of time interval signals. A row adder is given in a group receiving on a second input of a calculation circuit, a signal representative of the number of active allocation demand signals present on the inputs associated with the lower row adders as well as on the input with which it is associated. The output of each adder is connected to the input of a register whose command input is provided to receive the associated allocation demand signal. Each register then delivering, if the said corresponding demand signal is active, an allocated time interval signal, the output of the last adder of a group forming the output of the group.

According to another characteristic of the invention, the time interval management unit receives the time interval value which is present on the output of the last counter or of the last group and delivers it to the first counter or first group in so far as a value of the last time interval allocated.

According to another characteristic of the invention, when the difference between the time interval value of the signal received by the time interval management unit and the value of the current time interval is nil, the time interval management unit delivers a signal the value of which corresponds to the value of the current time interval plus one.

According to another characteristic of the invention each counter is provided so that when the difference between the time interval value of the signal present on its input and the value of the current time interval exceeds a predetermined threshold value, it no longer increases the time interval value on its input even if a cell is present on the corresponding input.

The invention likewise concerns, therefore, a multiplexer of the type comprising inputs intended to receive communication cells in cell time intervals and an output intended to supply, during a determined cell time interval, one of the cells.

According to one characteristic of the invention, it is essentially constituted by:

a time interval allocation system according to one of the embodiments previously described the time interval allocation demand input of which are respectively associated with the inputs of the said multiplexer, a plurality of cell memories, the writing inputs of which are respectively connected to the inputs of the multiplexers and the reading outputs of which are connected to the output of the multiplexer, the addressing in writing of a memory being connected to the output of the corresponding register of the allocation system and the addressing in reading input of the memory being connected to the local hour output of a time base.

a plurality of demand means generating respectively time interval allocation demand signals, each of the signals being rendered active if a cell is present on the corresponding input of the multiplexer.

According to another characteristic of the invention, a counter or an adder and a calculation circuit, the associated cell memory, the associated register and the associated demand means from together a single circuit, a so-called input circuit.

According to another characteristic of the invention, a cell memory and the associated register form together a single circuit, a so-called input circuit. The adders and the calculation circuit of a group are joined together to form a single group command circuit.

According to another characteristic of the invention, the command means serving to generate an active allocation demand signal are constituted by a translation memory the addressing in reading input of which is intended to receive the virtual circuit number of a cell on the corresponding input.

The invention likewise concerns a multiplexer which is likewise of the type permitting the transmission of the cells belonging to a same virtual circuit at time intervals substantially regularly spaced temporally.

According to one characteristic of the invention, it is essentially constituted by:

a time interval allocation system according to one of the embodiments previously described the time interval allocation demand inputs of which are respectively associated with the inputs of the said multiplexer.

a plurality of cell memories the writing inputs of which are respectively connected to the inputs of the multiplexer and the reading outputs of which are connected to the output of the multiplexer. The addressing in writing input of each of the cell memories are connected to the output of an associated determination of writing address circuit.

a plurality of address memories the writing input of each of which is connected to the output of an associated unit for determination of the estimated time of cell transmission, the addressing in reading inputs of the address memories being connected to the local time output of a time base.

a plurality of transmission memories the writing input of each is connected to the reading output of corresponding address memory, the reading output of each of which is connected to the addressing in reading input of the corresponding cell memory, the addressing in writing input of a transmission memory being connected to the output of the register of the corresponding allocation system and the addressing in reading of the memory being connected to the local time output of the time base, each allocation demand signal being rendered active at the moment of the reading of the corresponding address memory. According to another characteristic of the invention, each unit for determination of the estimated time of cell transmission is constituted by a translation memory each of the divisions of which is addressed in reading by the virtual circuit number to which the cell present on the corresponding input belongs. Each division of the translation memory comprises a field in which is stocked a period assigned to the corresponding virtual circuit and a field containing the theoretical time transmission of the last cell transmitted which belongs to the virtual circuit. The reading outputs of the memory correspond respectively to the fields being respectively connected to the inputs of a calculation unit provided to deliver on its input the theoretical transmission time signal or estimated time of transmission and to supply it to the address in the writing input of the corresponding address memory. The signal is likewise supplied to the write input of the translation memory for its writing in the corresponding field.

According to another characteristic of the invention, it comprises, in addition, an addresses availability circuit which, according to the availability of the division of the address memory addressed by the theoretical time of transmission signal, determines an estimated time of transmission signal.

The characteristics of the invention mentioned above as well as others, will appear more clearly on reading the description of preferred embodiments, the description being made in relation to the attached drawings, among which.

Figure 1:
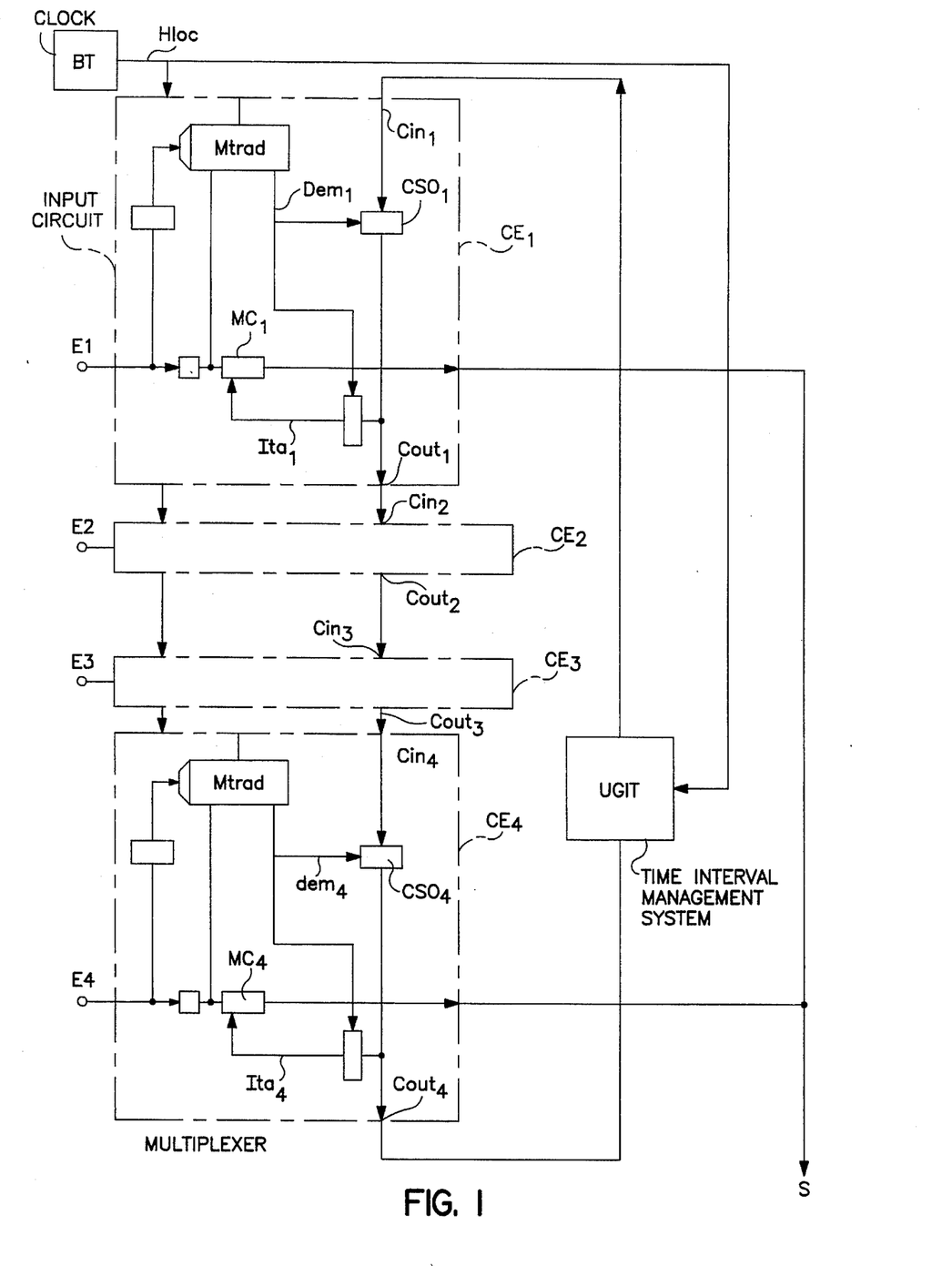
FIG. 1 is a synoptic diagram of a multiplexer according to a first embodiment of the invention.

The multiplexer represented in FIG. 1 comprises four inputs $E_1$ to $E_4$ and an output S. The inputs $E_1$ to $E_4$ are respectively connected to the inputs of input circuits $CE_1$ to $CE_4$ the outputs of which are connected to the output S. It also comprises a time interval management unit UGIT provided to deliver at each time interval, a signal representative of the last interval which has been allocated. It also comprises a time base BT the output of which delivers a local time signal Hloc, is connected to each of the corresponding inputs of the input circuits $CE_1$ to $CE_4$ and likewise to an input of the unit UGIT.

Figure 2:
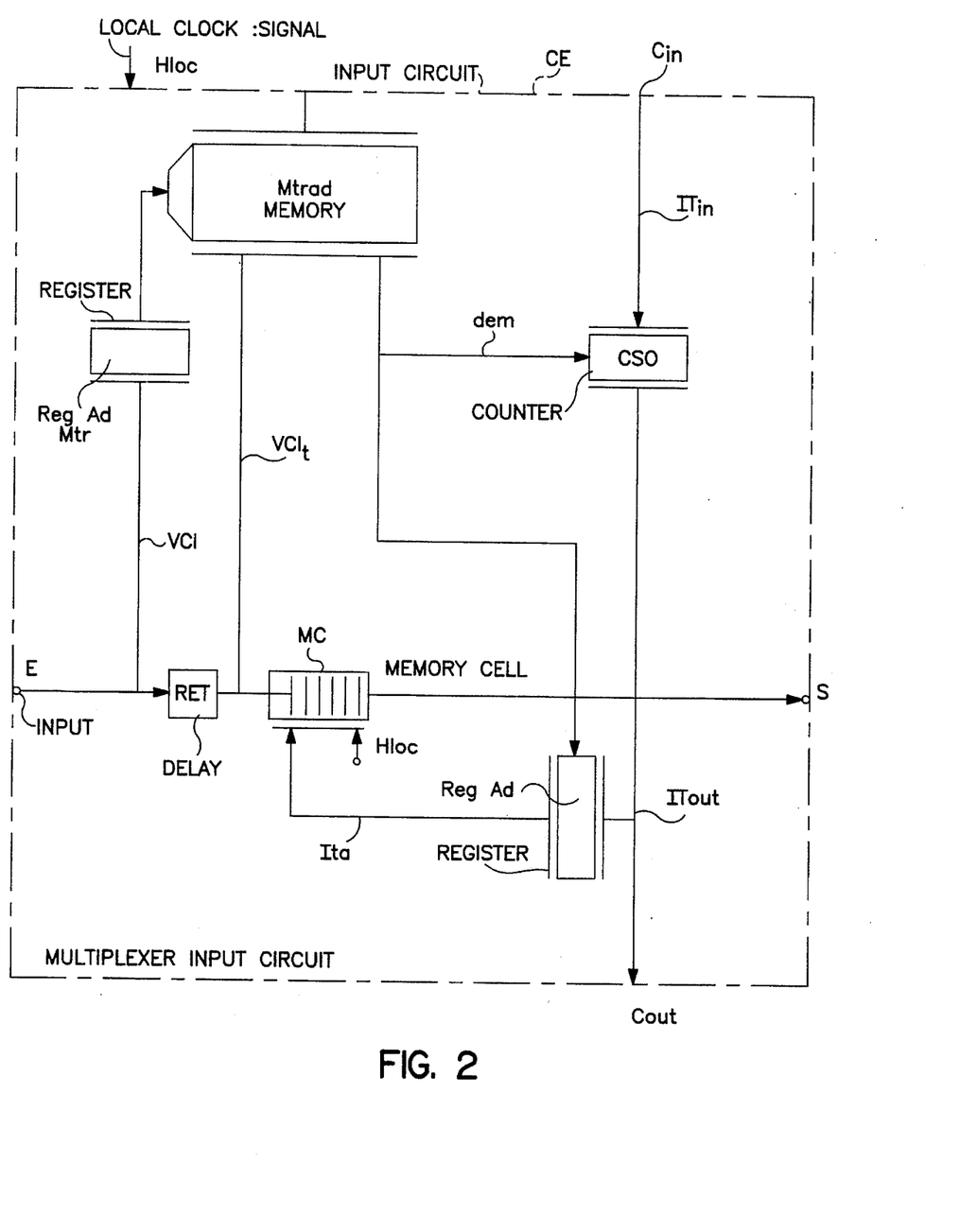
FIG. 2 is a synoptic diagram of an input circuit of a multiplexer according to the invention.

There is represented in FIG. 2 the synoptic diagram of an input circuit CE. The circuit CE represented comprises essentially a multi-wire input E, a register RegAdMtr, a translation memory Mtrad, a cells memory MC, a delay circuit RET, a register RegAd and a counter CSO.

The memory Mtrad is a memory of the type memory with aleatory access the memorization divisions of which are respectively associated with virtual circuits which can deal with the system. In each of these divisions are stocked, at the starting of the system, the virtual circuit number $VCI_t$ corresponding to the virtual circuit associated with the said division as well as a bit dem, so-called by the sequence bit of time interval allocation demand.

The memory MC is a memory comprising a certain number of divisions each of which is provided for memorizing one cell.

The wires which carry the virtual circuit VCI number to which the cell present on the input E belongs are connected to the input of the register RegAdMtr the output of which is connected to the addressing in reading input of the translation memory. In reading, this latter delivers a virtual circuit number translated $VCI_t$ which is then supplied to the input of the memory MC as well as the said allocation demand bit dem.

The other wires are connected via a delay circuit RET, to the input of the memory MC. The delay circuit RET is provided to compensate the time delays introduced by the memory Mtrad.

The memory MC has its reading output which is connected to the output S of the circuit CE.

Each division of the memory MC is addressed on reading by the local time signal Hloc delivered by the time base BT of the multiplexer and is addressed in writing by the allocated time interval signal ITa delivered by the register RegAd.

The counter CSO has its input connected to the so-called time interval input Cin of the input circuit EE and its output connected to the time interval output cout of the circuit CE. It also comprises a command input which is connected to an output of the memory Mtrad to receive there the allocation demand signal dem.

The counter CSO receives on its input a time interval value ITin present on the input of the Cin of the input circuit CE. If the allocation demand signal dem on its command input is not active, this time interval value is delivered on its output and therefore on the time interval output Cout of the input circuit CE. On the contrary, if the allocation demand signal dem is active, that is to say, when a cell is present on the input E of the input circuit CE, the time interval value ITin on the input of the counter CSO is increased by a unit and the increased value is delivered on its output and therefore on the output Cout of the input circuit CE.

The register RegAd has its input connected to the output of the counter CSO. It has a command input which is connected to the output of the memory Mtrad which carries the allocation demand signal dem. When the allocation demand signal dem is active, the time interval value ITout present on the input of the register RegAd is transformed on its output and forms the allocated time interval signal ITa. When the signal dem is not active, the value ITa on the output of the register RegAd is not modified whatever may be the time interval value ITout present on its input.

It can be seen in FIG. 1 that the time interval output $cout_n$ of the input circuit $CE_n$ of row n is connected to the time interval input $Cin_n +_1$ of the input circuit $CE_{n+1}$ of row n +1. It can likewise be seen that the time interval input of the first input circuit $CE_1$ is connected to the output of the unit UGIT and that the input of this latter is connected to the time interval output $Cout_4$ of the last input circuit $CE_4$.

The multiplexer represented in FIG. 1 comprises four inputs $E_1$ to $E_4$ and one output S but the invention likewise concerns multiplexers with n inputs and one output S.

It will be noted moreover that it is not necessarily constituted by a plurality of input circuits like that represented but may be a single and same circuit. The fact that it presents several input circuits CE has the advantage that it is modular.

The operation of a multiplexer according to the invention is as follows.

At the starting of the multiplexer, the time interval management unit UGIT delivers on its output a signal, the time interval value of which is equal to the current time interval Hloc plus one. This value is supplied on the input $Cin_1$ of the first input circuit $CE_1$.

Let us assume, in a first time, that there is no cell on the inputs $E_1$ to $E_4$.

The time interval value which is present on the input $Cin_1$ is found again on the output $Cout_1$ and, consequently, on the input $Cin_2$ of the input circuit $CE_2$. In fact, the absence of cells on the input $E_1$ implies that the allocation demand signal $dem_1$ which is delivered by the memory $Mtrad_1$ on the command input of the counter $CSO_1$ is not active.

It will be understood that, for the same reason, the count value present on the input $Cin_2$ of the input circuit $CE_2$ is found again on the output $Cout_2$ and therefore on the input $Cin_3$ of the input circuit $CE_3$. If no cell is present on any of the inputs of the circuits $CE_1$ to $CE_4$ the time interval value on output of the last input circuit $CE_4$ is found again on the input of the management unit UGIT.

The management unit UGIT is provided so that when the difference between the time interval value of the signal on the output of the last counter $CSO_4$ and the current time interval value Hloc such as it is delivered by the time base BT is nil, it delivers on its output and therefore on the input $Cin_1$ of the first input circuit $CE_1$ a time interval signal the value of which corresponds to the current time interval value Hloc plus one.

Furthermore each counter $CSO_1$ is provided so that when the difference between the time interval value of the single $IT_{in}$ present on its input and the current time interval value Hloc exceeds a predetermined threshold value it no longer increases the time interval value $IT_{in}$ on its input, even if a cell is present on the corresponding input $E_1$.

If, in a given time interval Hloc, a cell is present on an input Ei of an input circuit CEi, its heading, containing the VCI number to which it belongs, is supplied via the register RegAdMtr, to the addressing input of the memory Mtrad. This latter memory then delivers, on the one hand, a heading containing the $VCI_t$ number translated and, on the other hand, the allocation demand signal $dem_i$. The information part of the cell as well as its translated heading $CVI_t$ are then present on the writing input of the cell memory $MC_i$. The demand signal $dem_i$ is supplied to the command input of the counter $CSO_i$ as well as to the command input of the register $RegAd_i$. The counter $CSO_i$ increases by one unit the time interval value which is present on its input $Cin_i$ and delivers the increased value on its output insofar as allocated time interval new value.

The time interval new value is found again on the input of the register RegAd and likewise on its output. It addresses in writing the memory MC.

The cell on the input of the memory MC is therefore stored at the address, the value of which is equal to the time interval new value ITa. It will be seen that each time interval value which circulates from input circuit to input circuit represents the value of the last time interval which has been allocated for the transmission of a cell.

The memory MC is addressed in reading by the local time signal Hloc delivered by the time base BT. The cell which is stored at the corresponding address at the value of this signal Hloc is thus delivered on the outlet of the memory MC and is found again on the output S of the multiplexer.

In order to function correctly, each counter CSO must present a propagation time of the time interval value non-negligible in comparison with the elementary duration of a time interval.

According to a first realization variation each time interval delivered by the time base BT is subdivided into a certain number of micro-intervals $t_1$ to $t_m$ and one of these time micro intervals is assigned to each input circuit $CE_i$. The non-assigned time micro-intervals are taken in charge by the unit UGIT. When a time interval value is present at the instant $t_i$, on the input $Cin_i$, it or the time interval new value is found again on the output $Cin_{i+1}$ of the following input circuit $CE_{i+1}$ at the time $t_{i+1}$.

According to another variation, all the input circuits $CE_1$ to $CE_4$ operate in a strictly sychromous manner. The counters CSO of these input circuits are this time no longer connected to the time base BT. The propagation time of the count value of a following input circuit is equal not to a division of the duration of a time interval but to the time of propagation in the counter CSO of an input circuit CE.

It will be noted that each counter CSO may then be replaced by an adder which adds one to the time interval value ITin present on its input only if the allocation demand signal dem is active.

It will be noted that the memory Mtrad of each input circuit constitutes according to one embodiment among others a means for generating a demand signal dem when a cell is present on a corresponding input E of the multiplexer.

Figure 3:
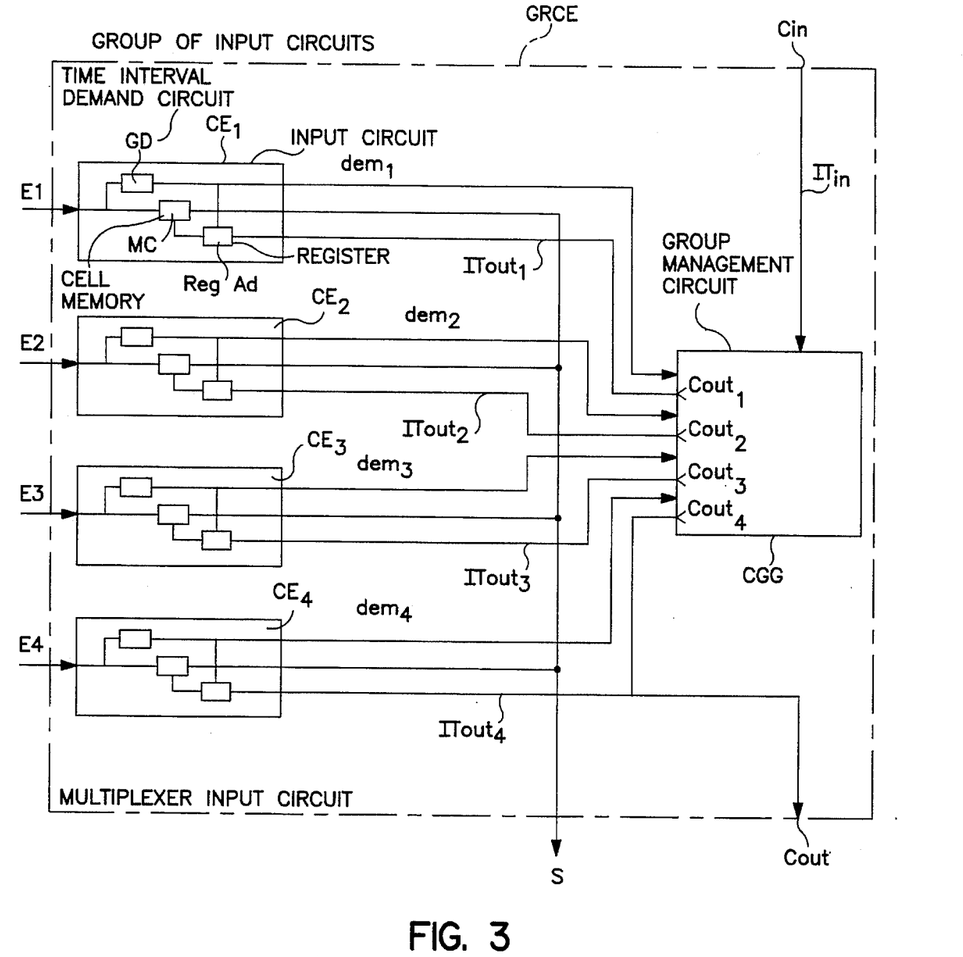
FIG. 3 is a synoptic diagram of a group of input circuits serving to form a multiplexer according to a variation of realization according to the invention.

There is represented in FIG. 3 a group GRCE of four input circuits $CE_1$ to $CE_4$ connected to a group management circuit Cgg. As will be understood by the following such a group of input circuits enables an increase in the number of inputs $E_1$ processed without increasing the speed of processing.

In FIG. 3 the input circuit $CE_1$ is represented with its cell memory MC, its means of generation of a time interval allocation demand GD and its register RegAd. The means GD delivers the demand signal $dem_1$ which is supplied to an input of the management circuits CGG, the output of the memory MC is connected to the output S of the group GRCE and the input of the register RegAd is connected to an output $Cout_1$ of the management circuit CGG. The other input circuits $CE_2$ to $CE_4$ are constituted and connected in a manner completely similar to the input circuit $CE_1$.

The group management circuit CGG has an input which is connected to the input Cin of the group GRCE to receive there the value of the last allocated time interval ITin. The time interval output Cout of the group GRCE is constituted by the signal delivered by the group management circuit CGG on its output $Cout_4$.

Figure 4:
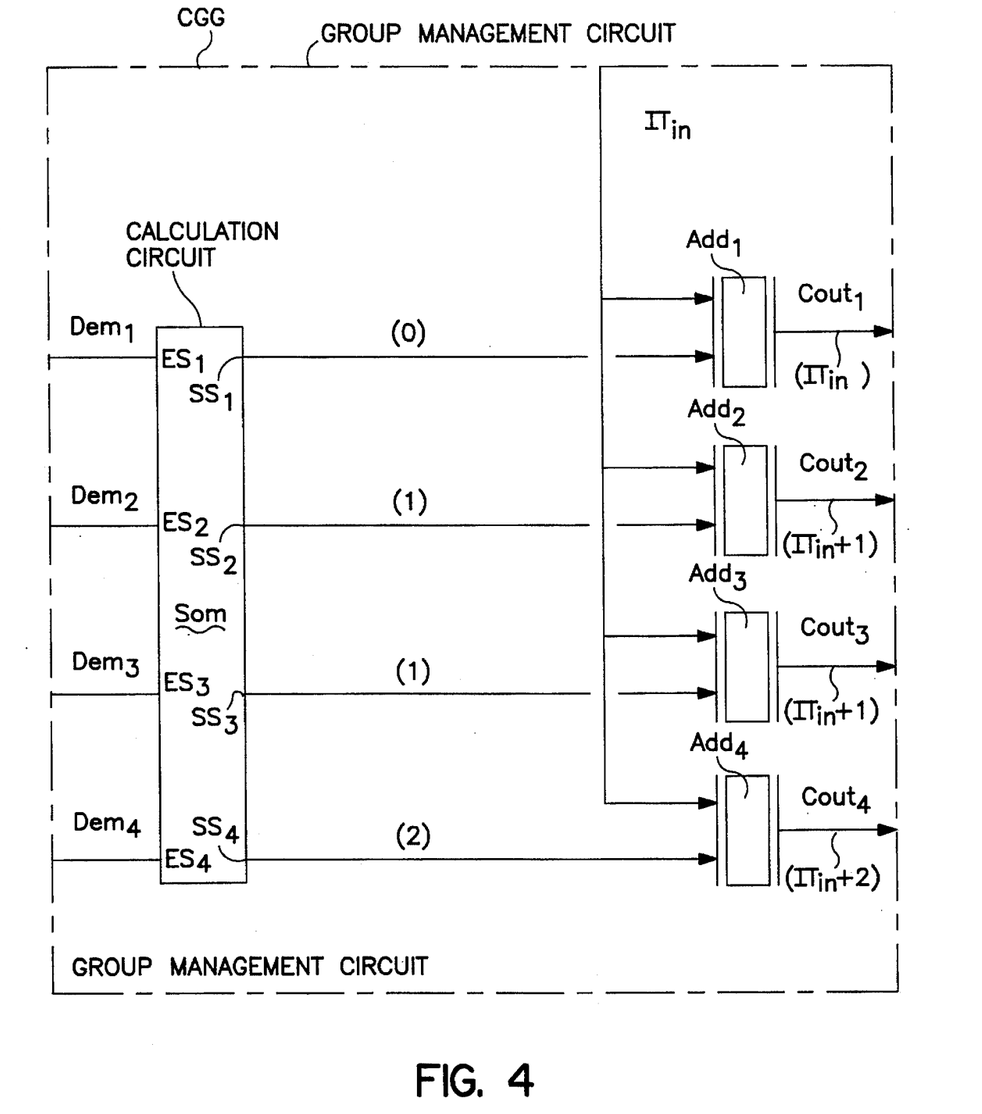
FIG. 4 is a synoptic diagram of a group management circuit equiping a group of input circuits according to FIG. 3.

There is represented in FIG. 4 a management circuit CGG. It is constituted by a calculation circuit Som which is provided with four inputs $ES_1$ to $ES_4$ which receive the allocation demand signals $dem_1$ to $dem_4$ generated by the input circuits $CE_1$ to $CE_4$ of the group GRCE (FIG. 3). It comprises four outputs $SS_1$ to $SS_4$ the first of which carries the value 1 or 0 according to whether the first allocation demand signal $dem_1$ is active or not, the second of which carries the value of the number of active demand signals $dem_1$ and $dem_2$, the third of which carries the value of the number of active signals $dem_1$, $dem_2$ and $dem_3$ and the fourth output of which carries the number of active signals $dem_1$ to $dem_4$. Each output $SS_1$ of the circuit Som is connected to a first input of an adder $add_i$ the second input of which is provided for receiving the time interval value ITin present on the input Cin of the group GRCE. The output of each adder $Add_i$ constitutes the output $Cout_i$ of the group management circuit CGG.

The operation of such a group of input circuits is the following. For example, if, on the inputs $E_2$ to $E_4$ of the group GRCE cells are respectively present, the allocation demand signals $dem_2$ and $dem_4$ are active. It follows that the first output $SS_1$ of the circuit Som of the group management circuit CGG carries the value 0, the second $SS_2$ carried the value 1, the third $SS_3$ carries likewise the value 1 and the last $SS_4$ carries the value 2. The inputs of the registers RegAd of the input circuits $CE_1$ to $CE_4$ therefore receive time interval values respectively equal to the value ITin ($ITout_1$=ITin), a value equal to ITin+1 ($ITout_2$=ITin+2) a value ITin+1 and a value ITin+2 ($ITout_4$=ITin+2). The time interval values of this example are in parenthesis in FIG. 4. Only the registers of the input circuits $CE_2$ and $CE_4$ will store the time interval values ITin+1 and ITin+2 present on their inputs. The others will not be modified. Moreover, the value ITin+2 is supplied to another group of four input circuits.

The fact of regrouping the input circuits $CE_1$ to $CE_4$ in a group GRCE command by a group management circuit CGG permits of extending the processing capacity in number of inputs without increasing the speed of generation.

It will be noted that the group of input circuits GRCE represented in FIGS. 3 and 4 could likewise constitute by it alone, a multiplexer with four inputs $E_1$ to $E_4$.

At group GRCE is represented which comprises four input circuits. It will be understood that, on the same principle, one could increase or deminish this number without departing from the scope of the present invention. However, the number of interconnections increases rather rapidly with the number of input circuits.

Figure 5:
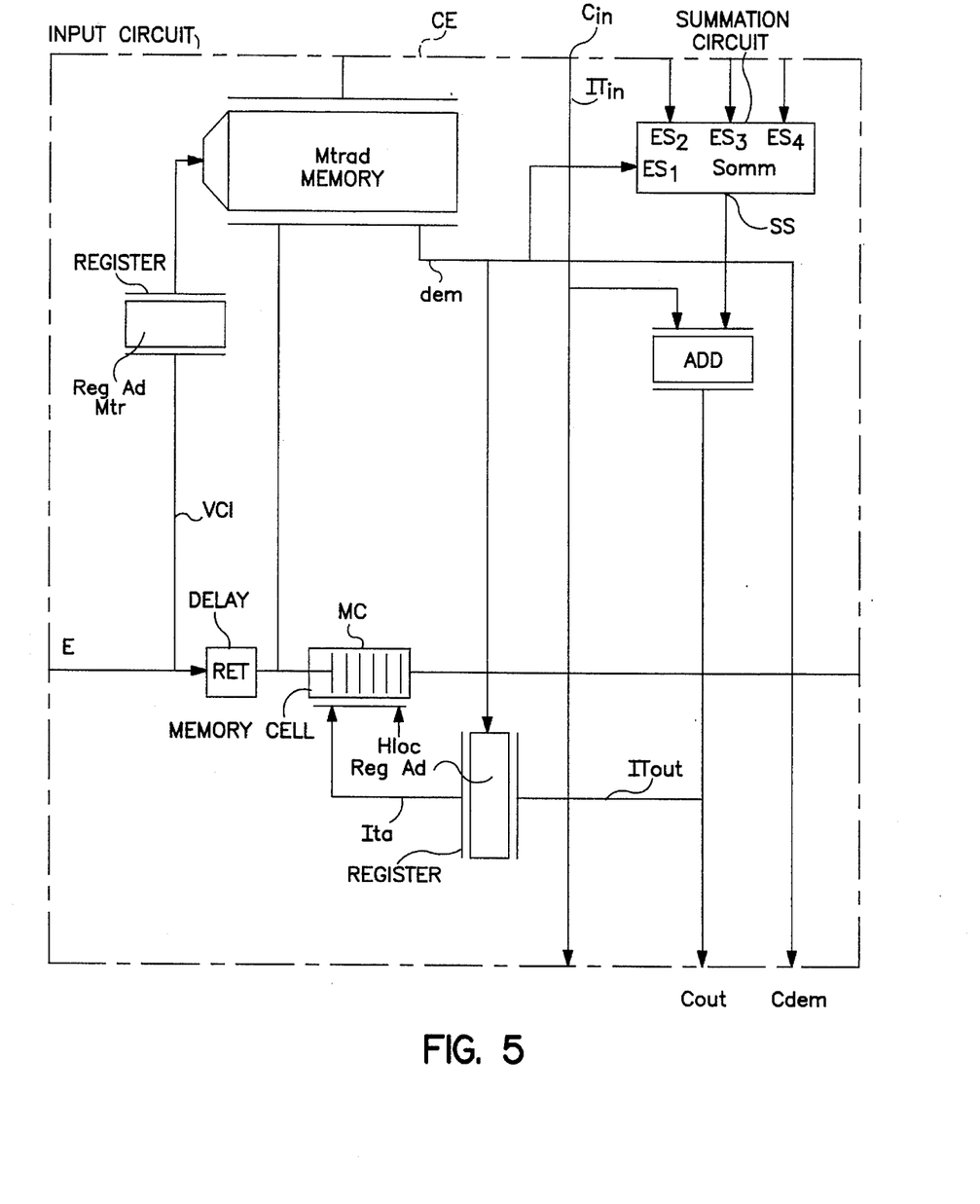
FIG. 5 is a synoptic diagram of an input circuit of a multiplexer according to another embodiment of the invention.
Figure 6:
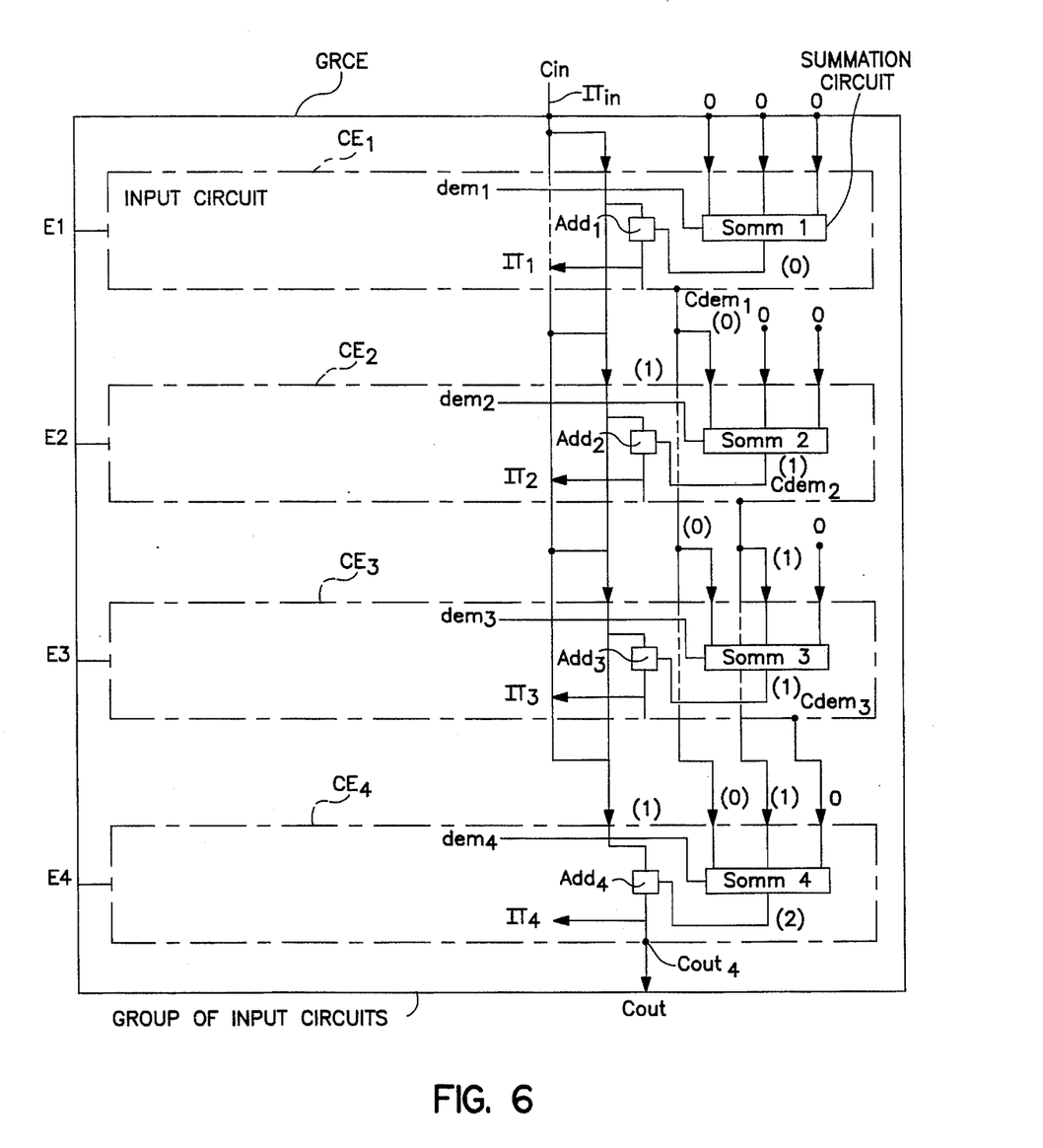
FIG. 6 is a synoptic diagram of a group of input circuits of a multiplexer, the said input circuit being realized according to the embodiment represented in FIG. 3.

In order to avoid the use of a group supplementary management circuit there is provided an input circuit CE such as that represented in FIG. 5. A group of four input circuits according to FIG. 5 is represented in FIG. 6. Compared with the input circuit CE of FIG. 2, the input circuit CE of FIG. 5 comprises in addition a summation circuit Somm with four inputs $ES_1$ to $ES_4$ intended to receive respectively allocation demand signals $dem_1$ to $dem_4$ as will be explained further on in relation to FIG. 6. The summation circuit Somm delivers on its output a signal SS representative of the number of its inputs $ES_1$ to $ES_4$ which carry an active allocation demand signal dem and supplies it to a first input of an addition circuit Add the other input of which is provided to receive the time interval value ITin present on the input Cin of the input circuit CE. The output of the addition circuit Add constitutes the output Cout of the input circuit CE and the signal ITout which is carries it supplied to the input of the register RegAd. The allocation demand signal dem is found again on the output Cdem of the input circuit CE.

Four signal circuits $CE_1$ to $CE_2$ such as that represented in FIG. 5 are interconnected in the manner shown in FIG. 6. The four input circuits $CE_1$ to $CE_4$ represented form together a group GRCE. The input circuits $CE_1$ to $CE_4$ are represented by dot and dash lines and by their circuits $Somm_1$ to $Somm_4$ and by their circuits $Add_1$ to $Add_4$. It can be seen that the inputs $ES_1$ of the summation circuits $Somm_1$ to $Somm_4$ receive respectively the allocation demand signals $dem_1$ to $dem_4$. It can likewise be seen that the three inputs $ES_2$ to $ES_4$ of the summation circuit $Somm_1$ of the first input circuit $CE_1$ are connected at zero, that the input $ES_2$ of the circuit $Somm_2$ of the input circuit $CE_2$ is connected to the output $Cdem_1$ of the first circuit $CE_1$ while the other inputs $ES_3$ and $ES_4$ of the circuit $Somm_2$ are connected to zero. The input $ES_2$ of the summation circuit $Somm_3$ of the third input circuit $CE_3$ is connected to the output $Cdem_1$ of the first circuit $CE_1$, its input $ES_3$ is connected to the output $Cdem_2$ of the second circuit $CE_2$ while its input $ES_4$ is connected to zero. Finally, the input $ES_2$ of the summation circuit $Somm_4$ of the fourth input circuit $CE_4$ is connected to the output $Cdem_1$ of the first input circuit $CE_1$ the input $ES_3$ to the output $Cdem_2$ of the second circuit $CE_2$ and the input $ES_4$ to the output $Cdem_3$ of the third circuit. The output $Cout_4$ of the fourth input circuit $CE_4$ constitutes the time interval output Cout of the group GRCE.

The input Cin of all the input circuits $CE_1$ to $CE_4$ is connected to the interval input Cin of the group GRCE.

The operation of such a group GRCE is as follows. Let us assume, as in the preceding example, that the inputs $E_2$ and $E_4$ of a group comprising the inputs $E_1$ to $E_4$ have effected a demand, that is to say, that the allocation demand signals dem$_2$ and dem$_4$ are active. The output of the first circuit Somm$_1$ carries the value 0 with the result that the value of IT$_1$ is equal to ITin on the input Cin of the group GRCE. The output Cdem$_1$ of the first input circuit CE$_1$ carries the value zero.

The output of the second circuit Somm$_2$ carries the value one insofar as the demand signal dem$_2$ is active. The value IT$_2$ is therefore equal to the value ITin+1. The signal dem$_2$ being active, the cell present on the input E$_2$ is therefore stored in the memory MC of the input circuit CE$_2$ at the address corresponding to ITin+1. The value Cdem$_2$ of the second circuit CE$_2$ is equal to one.

The output of the third circuit Somm$_3$ ensures the value one insofar as only the input ES$_3$ of the circuit Somm$_3$ carries the value one, the others being at zero. The value IT$_3$ is equal to the value ITin+1 but it is not used in the input circuit CE$_3$. The output Cdem$_3$ carries the value one.

The output of the fourth circuit Somm$_4$ carries the value two insofar as the allocation demand signal dem$_4$ is active and the input ES$_3$ of the circuit Somm$_4$ carries a value equal to one. The value IT$_4$ is equal to ITin+2 and the cell in the input E4 is stored at the address of the memory MC of the input circuit CE$_4$. The output Cout$_4$ therefore carries the value ITin+2. This value corresponds, in the system, to the last time interval IT for which a cell transmission has been provided.

It will be noted that the propagation time of the time interval value ITin of the input Cin at the output Cout is substantially that of a single input circuit CE according to FIG. 2.

Figure 7:
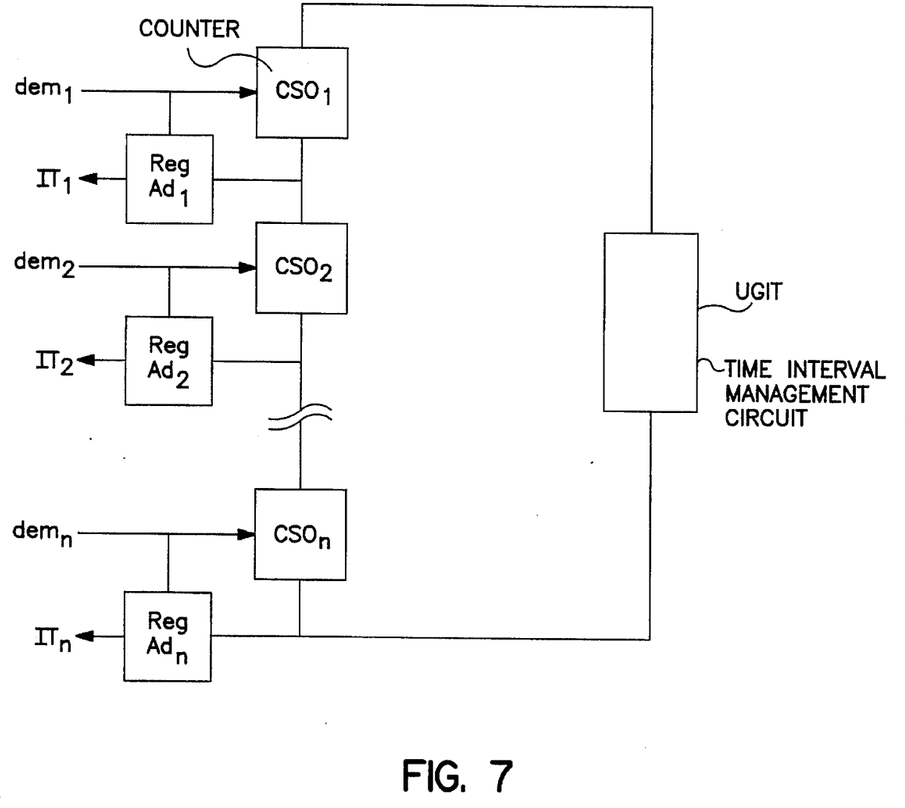
FIG. 7 is a synoptic diagram of a time interval allocation system according to the invention.

A time interval allocation system according to the invention is represented in FIG. 7. It comprises a time interval management unit UGIT and a plurality of counters CSO$_1$ to CSO$_n$ connected to one another in series so that the input of the counter CSO$_i$ is connected to the output of the preceding counter CSO$_{i-1}$ in the series so that the input of the first counter CSO$_1$ is connected to the output of the time interval management unit UGIT and that the output of the last counter CSO$_n$ is connected to an input of the unit UGIT. Each counter CSO$_i$ is associated with an input carrying an allocation demand signal dem$_i$ and is provided with a command input provided for receiving the said signal dem$_i$.

Each counter CSO$_i$ is provided for delivering either the time interval value present on its input if the corresponding allocation demand signal dem$_i$ is inactive or the time interval value present on its input increased by a unit if the corresponding demand signal dem$_i$ is active. The output of each counter CSO$_i$ is connected to the input of a register RegAd$_i$ the command input of which is provided for receiving the said corresponding demand signal dem$_i$.

Each register RegAd$_i$ is provided for delivering, if the said corresponding demand signal dem$_i$ is active, an allocated time interval signal IT$_i$.

The operation of the unit UGIT is the same as that of the unit UGIT of the multiplexes of FIG. 1. It is the same with the counters CSO.

It will be noticed that the multiplexes of FIG. 1 may be considered as being constituted by a plurality of cell memories MC each associated with an input E$_i$ of the multiplexers, a plurality of demand means Mtrad and a time interval allocation system such as that represented in FIG. 7. Each memory MC is addressed in writing by the time interval signal IT$_i$ delivered by the register RegAd$_i$ of the allocation system.

The operation of the allocation system of FIG. 7 may therefore be deduced from the operation of the multiplexer according to FIG. 1.

It will likewise be understood that the multiplexers of FIG. 3 and of FIG. 5 may be considered as being provided with time interval allocation means, a plurality of cell memories and a plurality of means for generation of allocation demand signals.

It will be noted that each input circuit CE$_1$ may be equipped with a temporal spacing device for two cell transmission belonging to a same virtual circuit such as one of the devices described in particular in the documents of Patents FR-A-2668324 and FR-A-2686205.

Figure 8:
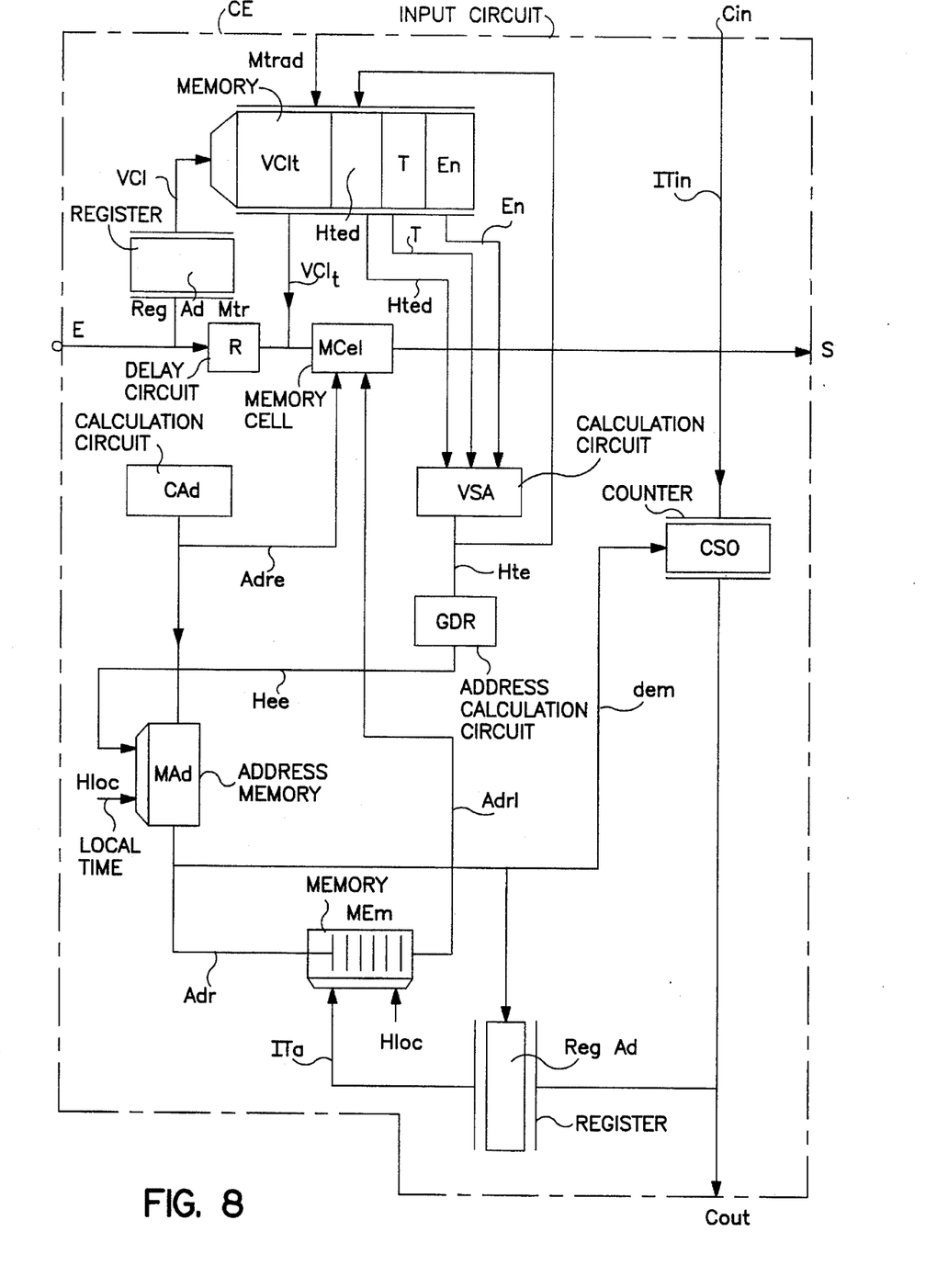
FIG. 8 is a synoptic diagram of an input circuit of a multiplexer according to the invention which is equipped with transmission of cells spacing means.

In FIG. 8 is represented an input circuit CE which is provided with means for spacing of the cells present on its input E. Such a system has, as its object the transmission of the cells belonging to a same virtual circuit with the intervals substantially regularly spaced temporally, for example, by a period T.

The input circuit CE comprises a counter CSO which has an input Cin and an output Cout. The counter CSO is commanded by a time interval allocation demand signal dem present on its command input. It also comprises a register RegAd the input of which is connected to the output of the counter CSO and the command input of which is provided for receiving the allocation demand signal dem. It delivers on its output an allocated time interval signal ITa.

A part of a time interval allocation system according to FIG. 7 will be recognized there. It will be noted that the multiplexer described here could be provided with a time interval allocation system with extension (see FIG. 3 and 5).

The multiplexer according to FIG. 8 comprises furthermore a cell memory MCel the writing input of which is connected via a delay circuit R, to the input E of the input circuit CE. The output of the memory MCel is connected to the output S of the circuit CE. The memory MCel is provided in order to be able to store the cells which are present on the input E of the circuit CE.

It comprises a memory Mtrad each division of which, addressed by a virtual circuit VCI number, contains, besides a translated virtual circuit number VCIt and a validation signal En, a part, so-called of context, containing the theoretical time of transmission Hted of the last cell transmitted having the virtual circuit number VCI associated with the division as well as the period of time T assigned to the cells which belong to this virtual circuit VCI.

The cells which are stored in the memory MCel are so with their translated virtual circuit number VCIt such as is delivered by the memory Mtrad.

The reading output of the memory Mtrad carrying the theoretical time Hted, the period T and the validation bit En are connected to the corresponding inputs of a calculation circuit VSA of the theoretical time of transmission Hte of the current cell present on the input E. The output of the calculation circuit VSA is connected to the writing input in the field Hted of the memory Mtrad. It is likewise connected to the input of an address calculation circuit available GDR the output of which is connected to the addressing in writing input of an address memory MAd.

The function of the calculation circuit GDR is to calculate the first unoccupied address of the memory MAd of corresponding value Hee at an estimated time of transmission, this from the address which corresponds to theoretical time Hte delivered by the calculation circuit VSA. Such a circuit is, for example, constituted by the circuit described in the document FR-A-2617302 under the reference MAD.

A calculation circuit of writing addresses available CAd has its output connected to the addressing in writing input of the cells memory MCel in order to deliver an available address Adre so as to memorize at this address Adre, the current cell present on the input E. The circuit CAd may be constituted by a counter the output of which is increased by a unit at each arrival of a cell on the input E.

The output of the circuit CAd is likewise connected to the writing input of the memory MAD. Thus, the address Adre, that is to say, the address where the current cell is stored is memorized in the memory MAd at an address which corresponds to the estimated time of transmission Hee delivered by the circuit CDR.

The addressing in reading input of the memory MAd is connected to the time base in order to receive there the local time signal Hloc. The reading output of the memory MAd is connected to a writing input of a transmission memory MEm the reading output of which is connected to the addressing in writing input of the memory MCel in order to deliver there or reading address Adrl. During the reading of the memory MAd, its output delivers the time interval allocation demand signal dem to the command input of the counter CSO.

The memory MEm has its addressing in writing input connected to the output of the register RegAd.

The memory MEm has its addressing in reading input connected to the time base BT in order to receive there the local time signal Hloc.

The operation of the circuit represented in FIG. 8 is as follows.

When a cell is present on the input E its virtual circuit number addresses via the register RegAdMtr, the memory Mtrad. It delivers then a translated virtual circuit number VCIt.

It likewise delivers the theoretical time of transmission Hted of the last cell transmitted belonging to the same virtual circuit as the current cell present on the input E. It delivers furthermore the period T which is assigned to this virtual circuit. It delivers finally a validation signal En.

The time Hted, the period T and the validation signal En are delivered to the calculation circuit VSA which delivers the theoretical time of transmission Hte of the cell present on the input E. This time is, for example, calculated by addition of the time Hted and the period T. It is delivered to a writing input of the memory Mtrad for its storage at the place of the value Hted.

The time Hted is delivered to the calculation circuit GDR which delivers the estimated time of transmission Hee and supplies it to the addressing in writing input of the memory MAd.

The calculation circuit CAd delivers the corresponding address signal Adre to a non-occupied address of the memory Mcel. This address signal Adre is delivered to the addressing in writing input of the memory Mcel so that it stores there the cell which is present on the input E of the circuit CE. This address signal is likewise supplied to the writing input of the memory MAd. The address at which is stored, in the memory Mcel, the cell on the input E is therefore stored in the memory MAd at an address which corresponds to the estimated time of transmission Hee calculated by the circuit GDR.

At each cell time Tc, a cell is present or not on the input E of the input circuit CE, a new value of time interval ITin is found again on the input Cin. It corresponds to the last time interval cell which has already been allocated.

At a given time Tc, the memory MAd is addressed in writing by the local time signal Hloc delivered by the time base BT. The memory MAd then delivers a corresponding address signal Adr to the address in the memory Mcel of a cell the estimated time of transmission of which is equal to the local time Hloc. It delivers further an active allocation demand signal dem which then commands the counter CSO. This latter increases therefore the time interval value ITin which is found on its input Cin and delivers this increased value on the output Cout.

The allocation demand signal dem being active, the register RegAdr likewise delivers the allocated time interval signal ITa on the addressing in writing input of the memory MEm. The address value Adr delivered by the memory MAd is therefore stored in the memory MEm at an address which corresponds to the interval of ITa.

During this time Tc, the memory MEm is likewise addressed in reading by the local time signal Hloc delivered by the time base. The memory MEm then delivers an address signal Adrl which is supplied to the memory Mcel. The cell stored at the address Adrl corresponding to this signal is then transmitted. It will be understood that it is transmitted during the cell time which has been assigned to it at the moment of the storing of its address in the memory MEm.

We claim:

1. A time interval allocation system comprising a time intervals management unit (UGIT) for delivering at each time interval a signal representative of a last time interval which has been allocated, a plurality of counters ($CSO_1$ to $CSO_n$) connected to one another in a cascaded series so that an input of one counter ($CSO_i$) is connected to an output of the preceding counter ($CSO_{i-1}$) in the cascaded series, the input of a first counter ($CSO_1$) in said cascaded series being connected to an output of the time interval management unit and the output of a last counter ($CSO_n$) being coupled to an input of said time interval management unit (UGIT), each of said counters ($CSO_i$) being associated with an input carrying a time interval allocation demand signal ($dem_i$) and having a command input for receiving the allocation demand signal ($dem_i$) and for delivering either a time interval value (ITin) present on its input if the allocation demand signal ($dem_i$) is inactive or the time interval value present on its input increased by a unit (ITin+1) if the demand signal ($dem_i$) is active, a register individually associated with each of said counters, and means for connecting the output of each of said counters ($CSO_i$) to an input of a corresponding register ($RegAd_1$), the register having a command input for receiving the demand signal ($dem_i$) supplied to the corresponding counter, the register ($RegAd_i$) then delivering an allocated time interval signal (ITa) if said corresponding demand signal ($dem_i$) is active.

2. A time interval allocation system according to claim 1 further comprising a local clock for outputting clock pulses defining timer intervals (Hloc), wherein each counter ($CSO_i$) is responsive to a difference between a time interval value (ITin) present on its input and the value of a current time interval produced by said local clock, and when the difference exceeds a predetermined threshold value, the counter stops increasing the time interval value (ITin) on its input.

3. A multiplex communication system using a time interval allocation system according to claim 2, comprising n inputs ($E_1$ to $E_n$) for receiving communication cells appearing in cell time intervals and an output (S) for supplying, during a predetermined cell time interval, one of the cells, said multiplex communication system including:

means for associating the command inputs of the time interval allocation system with the inputs ($E_1$ to $E_n$) of the said multiplex communication system;

a plurality of cell memories ($MC_1$ to $MC_n$), each of said cell memories having a writing input which is connected to a respective input ($E_i$) of the multiplex communication system and having a reading output which is connected to the output (S) of said multiplex communication system, a write address input of a cell memory (MC$_i$) being connected to an output of a corresponding register (RegAd$_i$) of said time interval allocation system, and a read address input of said cell memory being connected to receive the clock pulses of said local clock;

a plurality of demand means (Mtrad$_1$ to Mtrad$_n$) coupled to the inputs (E$_1$–E$_n$) of the multiplex communication system for generating respective time interval allocation demand signals (dem$_1$ to dem$_2$), each of said allocation demand signals being rendered active if a cell is present on a corresponding input of said multiplex communication system.

4. The multiplex communication system according to claim 3 wherein a single input circuit (CE$_i$) is formed by, a counter (CSO$_i$) the associated cell memory (MC$_i$), the associated register (RegAd$_i$) and the associated demand means (Mtrad$_i$).

5. The multiplex communication system according to claim 3 wherein each demand means comprises a translation memory (Mtrad) the read address input of which is coupled to receive a virtual circuit number of a cell received on a corresponding input (E$_i$) of said multiplex communication system.

6. A time interval allocation system comprising a time interval management unit (UGIT) for delivering at each time interval a signal representative of a last time interval which has been allocated, and a plurality of groups of input circuits (GRCE$_1$ to GRCE$_n$) connected to one another in a cascaded series so that an input of one group (GRCE$_i$) is connected to an output of the preceding group (GRCE$_{i-1}$) in the cascaded series, the input of a first group in said cascaded series being connected to an output of the time interval management unit (UGIT) and the output of a last group being coupled to an input of the time interval management unit, each of said groups (GRCE$_i$–GRCE$_n$) including a plurality of adders (Add$_i$) arranged in rows and a summation circuit (Som, Som$_i$), each adder having a first input connected to an input (Cin) of a corresponding group (GRCE$_i$) and being associated with an input carrying a time interval allocation demand signal (dem$_i$), an adder (add$_i$) of a row 1 in a given group (GRCE$_i$) receiving on a second input a signal from the summation circuit (Som, Somm$_i$) said signal being representative of a number of active allocation demand signals (dem$_1$ to dem$_{i-1}$) present on the inputs associated with adders of preceding rows as well as on the particular input with which it is individually associated, a plurality of registers (RegAd$_i$) individually associated with said adders, the output of each adder (Add$_i$) being connected to an input of a corresponding register (RegAd$_i$), each of said registers having a command input for receiving an associated allocation demand signal (dem$_i$), each register (RegAd$_i$) then delivering an allocated time interval signal (IT$_i$) if said allocation demand signal (dem$_i$) is active, the output of the last adder (Add$_i$) of a group (GRCE$_i$) forming the output of the said group (GRCE$_i$).

7. A time interval allocation system according to one of the claims 1 or 6 further comprising a local clock (BT) defining time intervals, wherein, when the difference between a value of the last time interval received by the time interval management unit (UGIT) and a value of a current time interval (Hloc) produced by said local clock is nil, the time interval management unit (UGIT) delivers to its output a signal having a value which corresponds to the value of the current time interval plus one (HLoc+1).

8. A multiplex communication system comprising n inputs (E$_1$ to E$_n$) for receiving communication cells appearing in cell time intervals; an output (S) for supplying, during a predetermined cell time interval, one of the cells; said multiplex communication system enabling transmission of cells belonging to a same virtual circuit at substantially regularly spaced time intervals; said multiplex communication system, comprising: a time interval allocation system according to one of the claims 1 or 6 wherein the inputs carrying the time interval allocation demand signals are respectively associated with the inputs (E$_1$ to E$_n$) of the multiplex communication system;

a local clock for delivering local clock pulses defining time intervals;

a plurality of cell memories (Mcel$_1$ to MCel$_n$), each of said cell memories having a writing input connected to an individually associated one of the inputs (E$_1$ to E$_n$) of the multiplex communication system and having a reading output connected to the output (S) of the multiplex communication system, a write address input of each of said cell memories (MCel) being connected to an output of an associated write address determination circuit (CAd);

a plurality of address memories (MAd$_1$ to MAd$_n$), each of said address memories having a writing input connected to the output of a corresponding write address determination circuit (CAd), and the write address input of each of said address memories being connected to an output of an associated estimated cell transmission time determination unit (Mtrad, VSA, GDR), the read address inputs of said address memories (MAd$_1$ to MAd$_n$) being connected to receive the local clock pulses of said local clock; and a plurality of transmission memories (MEm), each of the transmission memories having a writing input connected to a reading output of a corresponding address memory (MAd), and having a reading output connected to the read address input of a corresponding cell memory (MCel), the write address input of a transmission memory (MEm$_i$) being connected to the output of a corresponding register (RegAd$_i$) of said time interval allocation system and the read address input of the transmission memory being connected to receive the local clock pulses of the local clock, each allocation demand signal (dem$_i$) being rendered active at the moment of a reading of the corresponding address memory.

9. The multiplex communication system according to claim 8, wherein each estimated cell transmission time determination unit comprises a translation memory (Mtrad) having a plurality of locations each addressed for reading by the identifier (VCI) of a virtual circuit to which the cell appearing on a corresponding input belongs, each location of a translation memory (Mtrad) comprising a field containing a time period (T) assigned to the corresponding virtual circuit and a field containing a theoretical transmission time (Hted) of a last transmitted cell belonging to said virtual circuit, reading outputs of the translation memory (Mtrad) corresponding respectively to said fields being connected to the inputs of a calculation unit (VSA), said calculation unit delivering as an output either a theoretical transmission time (Hte) of a current cell belonging to the virtual circuit or an estimated transmission time (Hee) of the current cell and for supplying the delivered output to a write address input of the corresponding address memory (MAd), the delivered output also being supplied to the writing input of the translation memory (Mtrad) for storage in the corresponding field (Hted).

10. The multiplex communication system according to claim 9 further comprising an addresses availability circuit (GDR) responsive to an availability of the location in the address memory (Mad) addressed by the theoretical transmission time (Hte) of the current cell for determining the estimated transmission time (Hee) of the current cell.

11. The multiplex communication system according to claim 8 wherein each associated write address determination circuit (CAd) comprises a counter which is increased by one unit responsive to each arrival of a cell on the corresponding input (E) of the multiplex communication system.

* * * * *